United States Patent [19]

Daniels

[11] Patent Number: 4,775,118
[45] Date of Patent: Oct. 4, 1988

[54] ICE DETECTING SYSTEM

[75] Inventor: James W. Daniels, Kent, Wash.

[73] Assignee: The Boeing Company, Seattle, Wash.

[21] Appl. No.: 801,848

[22] Filed: Nov. 26, 1985

[51] Int. Cl.⁴ .............................................. B64D 15/00
[52] U.S. Cl. .................... 244/134 D; 340/580
[58] Field of Search ........... 244/134 D, 134 F, 134 R;
219/483; 340/580, 582; 73/170 R, 599

[56] References Cited

U.S. PATENT DOCUMENTS

| | | | |
|---|---|---|---|
| 3,240,054 | 3/1966 | Roth | 340/582 |
| 3,341,835 | 9/1967 | Werner et al. | 340/582 |
| 3,541,540 | 11/1970 | Hughes | 340/582 |
| 4,176,524 | 12/1979 | Kamiyama et al. | 340/582 |
| 4,461,178 | 7/1984 | Chamuel | 73/599 |
| 4,470,123 | 9/1984 | Magenheim et al. | 340/580 |
| 4,514,619 | 4/1985 | Kugelman | 244/134 D |
| 4,553,137 | 11/1985 | Marxer et al. | 244/134 F |

Primary Examiner—Sherman D. Basinger
Assistant Examiner—Jesûs D. Sotelo
Attorney, Agent, or Firm—Finnegan, Henderson, Farabow, Garrett and Dunner

[57] ABSTRACT

Ice detection apparatus for use with aircraft having an EIDI solenoid mounted in proximity to the aircraft skin includes a current pulse generator selectively supplying the EIDI solenoid with current pulses of first and second levels, the second level being effective to generate force upon the skin to remove ice from the skin, and the first level being less than the second level. An accelerometer mounted on the interior surface of the skin produces an output signal in response to force imposed on the skin by current pulses of the first level. The output of the accelerometer is a function of both the current pulse level and of the presence of ice. A comparator is provided to generate an output signal indicative of the presence of ice when the accelerometer output signal reaches a predetermined level.

16 Claims, 4 Drawing Sheets

ICE DETECTING SYSTEM

BACKGROUND OF THE INVENTION

The invention relates to ice detection systems and, more particularly, to ice detection systems for use in conjunction with ice removal systems.

The formation of ice on structures is, in certain applications, undesired and indeed dangerous. For example, the formation of ice upon exterior surfaces of an aircraft in flight is a well-known hazard, causing an increase in weight of the aircraft and a corresponding increase in fuel consumption. More importantly, however, the buildup of ice on wings and control surfaces of aircraft in flight can result in a decrease of lift and a degradation of the control function. Such conditions can result in extreme hazard to the aircraft. Accordingly, various methods have been devised for removal of ice from such aircraft surfaces.

Known methods of ice removal include the use of flexible pneumatic coverings, or "boots," on the leading edge surfaces of aircraft wings and control surfaces. These boots are periodically provided with pulses of air or other fluid to cause any ice which has accreted on the leading edge surface to be cracked away and removed by action of the airstream over the surface. Another method commonly used is to divert a portion of bleed air from the aircraft engine through passages of airframe structures having surfaces subject to icing, causing such surfaces to heat up and loosen any ice formed on the exterior portion of such surfaces.

Still another ice removal system is known as electro-impulse deicing (EIDI). In the EIDI system, a solenoid is mounted in proximity to the inner surface of a conductive thin-wall surface of the aircraft. High-current pulses of electrical energy are periodically supplied to the solenoid, causing the formation of eddy currents in portions of the conductive skin juxtaposed with the solenoid. Magnetic fields generated by such eddy currents interact with magnetic fields generated by the solenoid, producing a sudden electrodynamic force upon the portion of the surface containing the eddy currents, which fractures any ice which may have formed on the exterior surface of the skin, permitting its removal by the airstream.

All of these deicing systems have proved satisfactory in appropriate applications. However, none of such systems can be operated continuously. Continuous operation of pneumatic boots when icing conditions are not present will result in premature deterioration of the boot, while continuous operation of EIDI systems can produce unnecessary fatigue loading upon the surface of the skin. Bleed air systems require significant amounts of power, causing power to be diverted from the propulsion of the aircraft. This results in increased fuel consumption and in certain power settings of the engines, such as used during landing configuration, can result in such severe loading upon the engine as to result in a hazardous situation. It is therefore desirable to activate deicing systems only upon detection of ice upon critical aircraft surfaces.

Certain ice detection systems are known in the prior art. Many such systems employ a probe including a vibrating element, the resonant frequency of which is varied by the formation of ice upon the probe permitting such variation in frequency to be sensed and used to generate an ice indication signal. Such a device is shown, for example, in U.S. Pat. No. 3,541,540 to Hughes. Although such probes are useful in many applications it is possible, because of various aerodynamic differences between the structure of the probe and actual aircraft surfaces, that under certain conditions the probe may indicate the presence of ice when ice is not actually forming upon the critical surfaces of the aircraft. Moreover, the comparative rate of icing may be significantly different between the probe and such critical aircraft surfaces. Therefore, currently known ice detection systems are generally employed only in an advisory capacity to provide an indication of the existence of conditions amenable to ice formation upon critical aircraft surfaces and not as an indication of the actual presence of ice on such surfaces.

It is therefore desirable to provide a system for reliable indication of the actual presence of ice upon critical aircraft surfaces. It is further desirable to provide such a system which is compatible with existing types of deicing sytems and which results in a minimum increase in weight and complexity of aircraft sytems.

SUMMARY OF THE INVENTION

In accordance with the principles of the present invention, apparatus is provided for sensing and removing ice from a surface. The apparatus includes removal means for exerting an ice removal force upon receipt of an input signal, means for supplying an input signal to the removal means, and means for sensing a parameter which is a function of the input signal and of the presence of ice. The apparatus further includes means for generating an indicating signal when the sensed parameter reaches a predetermined reference level, thereby indicating the presence of ice.

In a preferred embodiment of the invention, there is provided apparatus for detecting the presence of ice upon the surface of an aircraft equipped with an electro-impulse deicing system, the system including a solenoid mounted in proximity to the surface. The apparatus of the preferred embodiment thus includes means for selectively supplying pulses of first and second levels to the solenoid, the first level being less than the second level. The apparatus of the preferred embodiment further includes means for sensing a parameter which is a function of current pulses of the first level and of the presence of ice, and means for generating an indicating signal when the sensed parameter reaches a predetermined reference level, thereby indicating the presence of ice.

The accompanying drawings, which are incorporated in and constitute a part of the specification illustrate one embodiment of the invention and, together with the specification, serve to explain the principles of the invention.

DESCRIPTION OF THE PREFERRED EMBODIMENT

Figure 1:
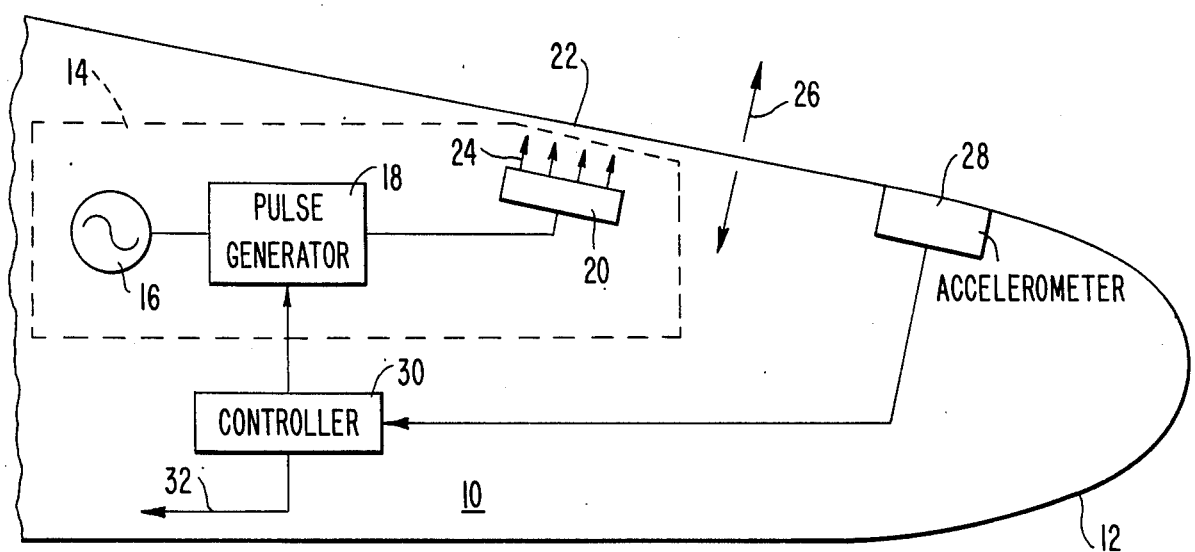
FIG. 1 is a schematic side view of a portion of an aircraft wing including a preferred embodiment of the invention with an electro-impulse deicing system.

Referring now to the drawings, in which like reference characters refer to corresponding elements, FIG. 1 shows a side view of a portion of an aircraft wing 12 incorporating a system 10 which is a preferred embodiment of the present invention. In accordance with the principles of the present invention, the system 10 includes an electro-impulse deicing (EIDI) system 14 which includes a power supply 16, a current pulse generator 18, and removal means responsive to an input signal for exerting an ice removal force upon an aluminum surface 22 of wing 12. As embodied herein, the removal means comprises an electro-impulse deicing solenoid 20.

Solenoid 20 is mounted in proximity to the inner surface of a portion of the surface or skin 22, of wing 12. When EIDI system 14 is used to deice skin 22, power from power supply 16 is formed into drive pulses of current to provide a magnetic field strength of 1.0 to 1.5 teslas at a frequency determined by the modal characteristics of the surface being de-iced. Such frequency varies according to the size and geometry of the structure being de-iced. The drive pulses are unipolar pulses with a rise time of approximately ¼ of the period of the desired modal excitation. For a structure representative of the outboard slat of an aircraft wing, pulses of about 2000 amperes having a rise time of 150 microseconds are generated at a frequency of 1500 Hz.

These drive pulses generate intense magnetic fields in solenoid 20 which induce eddy currents in that portion of skin 22 juxtaposed with solenoid 20. The eddy currents in turn generate magnetic fields which interact with magnetic fields produced directly by solenoid 20. The interaction between these magnetic fields causes a brief intense electrodynamic force to be exerted upon the portion of skin 22 juxtaposed with solenoid 20, as indicated by arrows 24. This force causes vibrational movement of skin 22 as indicated by arrows 26.

In accordance with the principles of the present invention, means are provided for sensing a parameter which is a function of the input signal to solenoid 20 and of the presence of ice. As embodied herein, the sensing means includes an accelerometer 28 fixedly attached to the inner surface of skin 22 which detects the vibrational movement thereof. Accelerometer 28 is positioned at a predetermined distance from solenoid 20, the distance being dependent upon the actual configuration of the specific surface upon which the system is mounted. For example, accelerometer 28 may be positioned at a distance from solenoid 20 of multiples of one half wavelength of the skin modal frequency; that is, the frequency at which the skin 22 vibrates when stressed by electrodynamic forces produced by drive pulses to solenoid 20. The drive pulse should be as close as possible to the skin modal frequency but need not be the same. In the described embodiment, for example, 1500 Hz drive pulses produce a skin modal frequency of 1566 Hz. For a particular application involving a specific structural configuration, some experimentation may be necessary to determine an acceptable position for accelerometer 28 so that proper output thereof is obtained.

The degree of vibration of skin 22 caused by solenoid 20 is dependent upon the intensity of current pulses applied to solenoid 20. Moreover, the presence of ice will change the manner in which skin 22 responds to electrodynamic forces imposed thereon by solenoid 20. Such changes in response are detected by accelerometer 28. Thus, accelerometer 28 senses a parameter which is a function of the input signal to solenoid 20 and of the presence of ice. The output of accelerometer 28 is supplied to a controller 30 to be more completely described.

The elements just described may thus be used to detect the presence of ice on skin 22. Since application of a full 1.0 to 1.5 tesla EIDI pulse to skin 22 for ice detection purposes would result in unnecessary stress to skin 22, different energy levels from those used in conventional EIDI systems may be employed for ice sensing. Accordingly, controller 30 provides a control signal to pulse generator 18 to cause pulse generator 18 to selectively apply pulses of first and second levels to solenoid 20. The first level, which is used for ice detection, is less than the second level. In the preferred embodiment, fields of the second level are generated at 1 to 1.5 teslas to cause sufficient force upon skin 22 to remove ice accreted thereon. Pulses of the first level are generated at a level sufficient to produce a signal distinguishable over ambient noise from airflow, precipitation, etc., yet not so great as to cause unnecessary fatigue stress, noise, and power consumption. Generally, pulses of the first level should be approximately an order of magnitude less than pulses of the second level. In the preferred embodiment, fields of the first level are approximately 1 to 0.15 teslas. This causes electrodynamic forces to be generated upon skin 22 much less than the ice removal pulses of the second level. However, forces generated upon skin 22 by pulses of the first level are sufficient to generate mechanical waves in skin 22 causing vibrational movement which can be detected by accelerometer 28. In the described embodiment, first and second level pulses of 1.0-1.5 teslas and 0.1-0.15 teslas may be generated by current pulses of 1500-2000 amperes and 150-200 amperes, respectively.

The presence of ice upon skin 22 affects such waves generated by pulses of the first level. Accordingly, movement of skin 22 caused by current pulses of the first level is a parameter which is a function of the pulse current level and of the presence of ice upon skin 22.

The invention provides means for generating an ice-presence indicating signal when the sensed parameter reaches a predetermined reference level. As embodied herein, such generating means comprises controller 30. Signals from accelerometer 28 which are detected following generation of first level pulses are supplied to controller 30. These signals are compared in controller 30 to a predetermined reference level. If the signals from accelerometer 28 are below the reference level, controller 30 indicates the presence of ice upon skin 22 and generates a ice-presence indicating signal over an output terminal 32 which energizes a warning indicator (not shown) in the cockpit announcing the presence of ice upon skin 22. The predetermined reference level is a level determined either experimentally or by mathematical calculation. In addition, the invention can be configured such that the presence of ice is indicated by either a value that exceeds the reference level or is lower than the reference level.

At certain applications, it may be determined that best performance may be obtained by the use of ice detection pulses (i.e. pulses of the first level) at a different frequency than ice removal pulses (i.e. pulses of the second level). In such cases, controller 30 is constructed to operate pulse generator 18 so as to generate pulses of the appropriate frequency.

Controller 30 may be constructed so as to cause generator 18 to continuously and automatically generate pulses of the first level. If ice is detected, controller 30 supplies a signal to pulse generator 18, causing pulse generator 18 to automatically begin generating second level current pulses and remove ice from the surface.

When skin 22 is subjected to an electrodynamic force generated by solenoid 20, it vibrates over a wide frequency band. That is, it vibrates in a plurality of modes, which modes are sensed by accelerometer 28.

Figure 2:
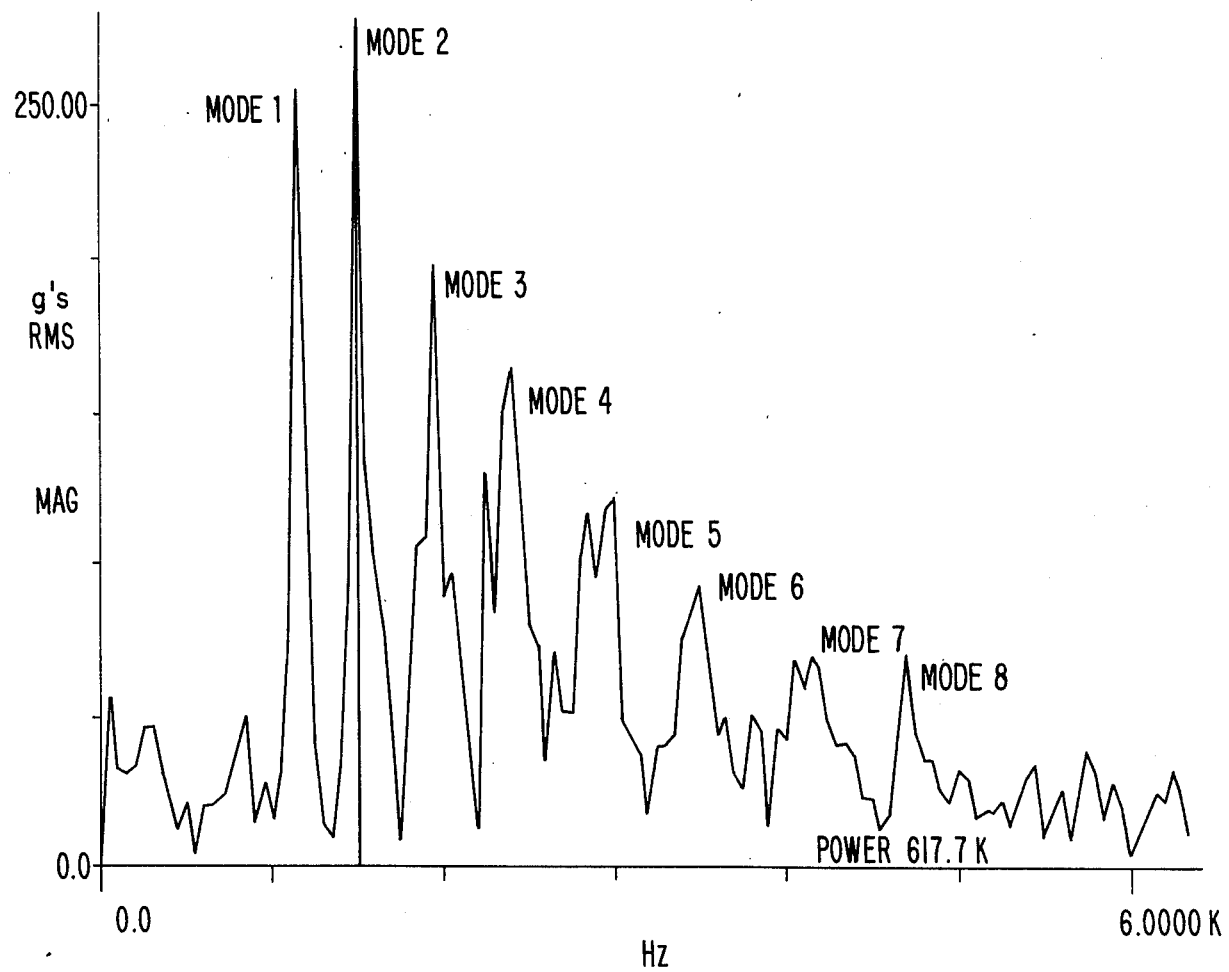
FIG. 2 is a graph of acceleration of a portion of a wing surface versus frequency when subjected to an electro-impulse deicing current pulse.

FIG. 2 shows a graph of the output of accelerometer 28 as a function of frequency, when accelerometer 28 is attached to the inner surface of a test structure representative of an outboard slat of an aircraft wing and subjected to an an electro-impulse deicing current pulse at a frequency of 1500 Hz. As can be seen, the acceleration of the surface occurs in a plurality of vibrational modes, indicated by peaks in FIG. 2. The first peak at the left-hand side of FIG. 2 indicates acceleration at the fundamental skin modal frequency of 1170 Hz, or mode 1. The second peak indicates acceleration in a second mode at a higher frequency than the fundamental frequency. Similarly, other modes of acceleration are shown in FIG. 2.

Figure 3:
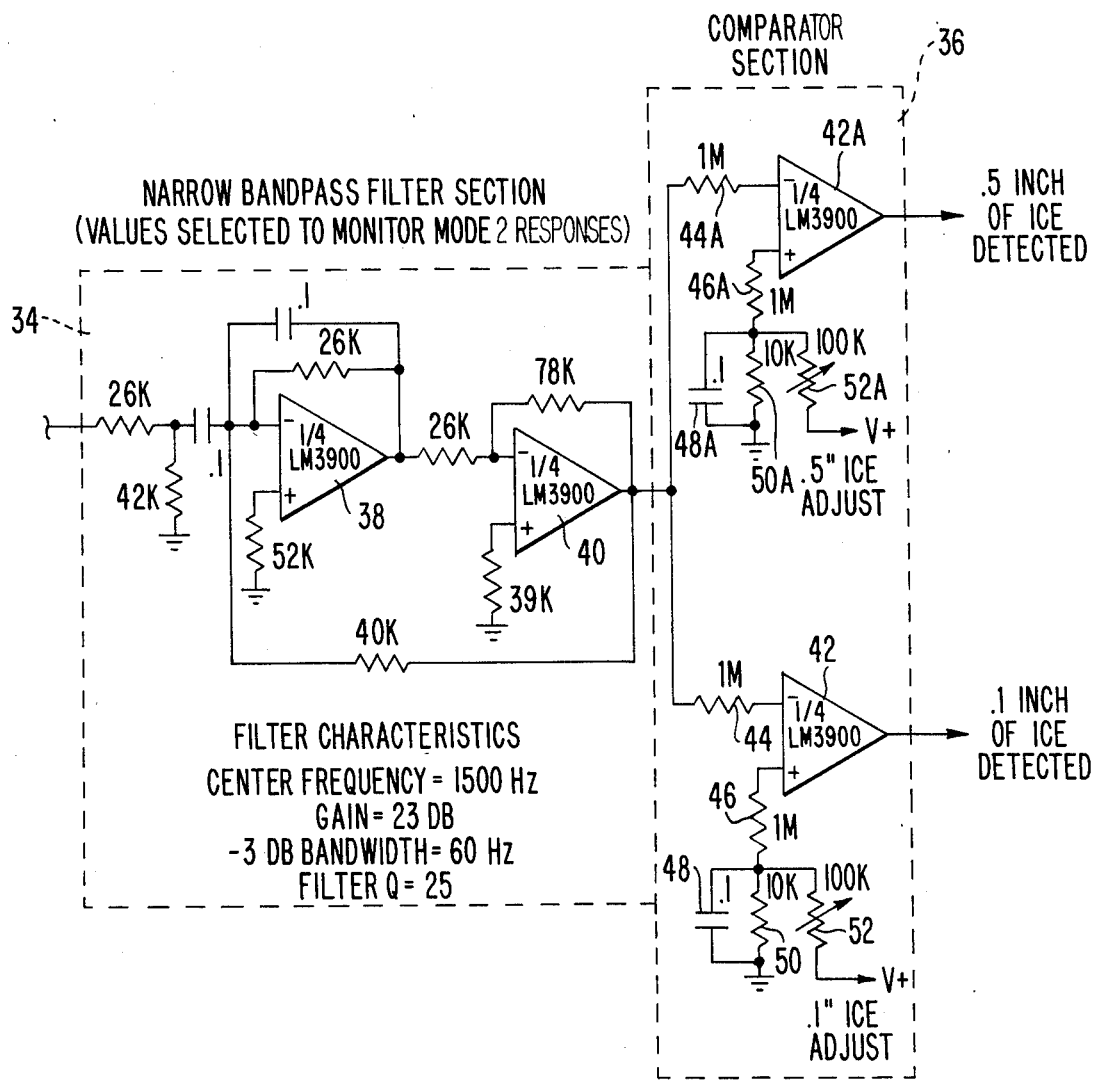
FIG. 3 is an electrical schematic diagram of a portion of the controller shown in FIG. 1.

FIG. 3 is an electrical schematic diagram of a narrow bandpass filter 34 and comparator circuit 36 which form controller 30. Filter 34 is tuned to monitor a portion of the wide-band frequency vibrations of skin 22, for example, the mode 2 response of signals detected by accelerometer 28. Filter 34 in the described embodiment has a center frequency of 1500 Hz, a gain of 23 dB, a −3 dB bandwidth of 60 Hz and a Q of 25. Filter 34 is of conventional construction and includes operational amplifiers 38 and 40 which may be, for example, two parts of a quad operational amplifier LM3900 obtainable from the National Semiconductor Corporation. The value of components associated with amplifiers 38 and 40 in filter 34 are selected in accordance with design parameters to obtain the previously described filter characteristics. Such design parameters are well-known and are published, for example, in Application Notes of the LM3900 published by National Semiconductor Corporation.

Comparator circuit 36 is connected to the output of amplifier 40 and includes an operational amplifier 42 connected as a comparator. Amplifier 42 may also be a portion of a quad operational amplifier LM3900. An input resistor 44 is connected in series with the output of amplifier 40 and the inverting input of amplifier 42. The non-inverting input of amplifier 42 is connected to a reference circuit including resistor 46, capacitor 48, resistor 50, and resistor 52. Resistor 52 is an adjustable resistor connected in series between resistor 46 and a source of operating voltage, not shown. Values of components 44 through 52 are well-known, and are selected according to design principles such as those published in the aforementioned Application Notes. Resistor 52 is adjusted so that the output of amplifier 42, which is normally at a logic HI level, switches to a logic LO level upon detection of 0.1 inches of ice upon the surface. That is, the output of amplifier 42 is at a logic HI level whenever the amplitude of mode 2 as shown in FIG. 2 is above a predetermined level. When more than 0.1 inches of ice accumulate upon surface 22, the amplitude of mode 2 as detected by filter 34 drops off sharply.

Mode 2 of the acceleration of skin 22 occurs, under normal conditions of no ice, at a frequency of approximately 1500 Hz. The presence of ice upon skin 22 will cause the peak of mode 2 response to be either reduced, shifted in frequency, or both. The output of filter 34 will sharply decrease upon occurrence of either of these phenomena. Accordingly, the output of amplifier 42 of comparator 36 will reliably change state upon detection of the presence of ice at least 0.1 inch.

The output of amplifier 40 is also connected to an amplifier 42A configured as a comparator. Components 44A, 46A, 48A, 50A and 52A are identical to corresponding components 44, 46, 48, 50 and 52, respectively. However, variable resistor 52A is adjusted to yield a reference voltage such that the output of amplifier 42A changes state upon detection of 0.5 inches of ice.

The design of the response of filter 34 is not limited to detection of the mode 2 response peak of acceleration of skin 22 but may be modified to detect any modal response peak desired, as dictated by the specific application. Moreover, in certain applications more sophisticated analysis of the output of accelerometer may be desireable. In such applications, controller 30 may include a microcomputer programmed to provide such analysis.

The invention is not limited to the use of an accelerometer to detect a parameter which is a function of both the input signal and the presence of ice. For example, a strain gauge could be used to monitor strain of skin 22 upon generation of a deicing pulse of of the first level, the strain of skin 22 being a function of both the current pulse supplied to solenoid 20 and of the presence of ice. Similary, a permanent magnet could be mounted upon the interior surface of skin 22 at a predetermined distance from solenoid 20 in juxtaposition with a Hall effect device. Generation of a current pulse of a first level to solenoid 20 would cause movement of skin 22 and the attached permanent magnet in a manner so as to generate an output from the Hall effect device. Movement of skin 22 is similarly a parameter which is a function of both the level of input signal to solenoid 20 and of the presence of ice.

Figure 4:
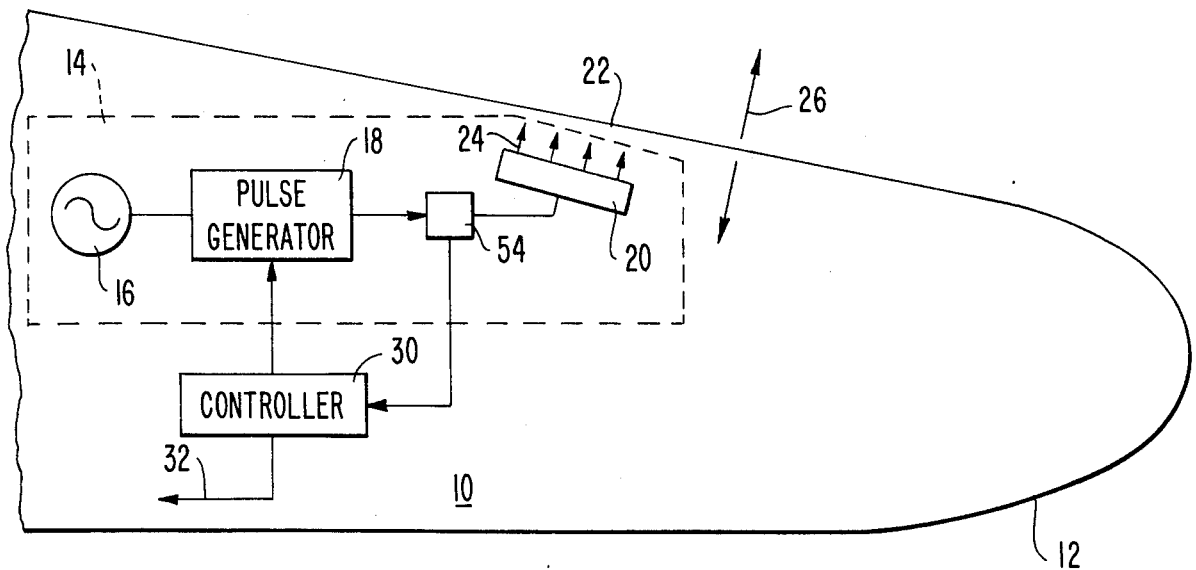
FIG. 4 is a view similar to FIG. 1 of an alternative embodiment of the present invention.

FIG. 4 shows a further alternative embodiment, in which a current detection device 54 may be connected in series circuit relationship between pulse generator 18 and solenoid 20. Device 54 may be, for example, a shunt, a current transformer, or a current detection circuit. The presence of ice on skin 22 may cause a loading effect on solenoid 20 which is detectable as a change in the level of current actually being supplied from pulse generator 18 to solenoid 20.

Under certain conditions, the use of device 54 may not be as sensitive as a separately mounted sensor such as accelerometer 28 in sensing a parameter which is a function of both the input signal to solenoid 20 and the presence of ice. However, device 54 may be mounted within pulse generator 18 and would not require separate physical mounting upon the measured surface.

The present invention, when used in conjunction with an EIDI system, provides the capability of detecting ice while avoiding unnecessary expenditure of power and unnecessary imposition of fatigue-inducing forces. By utilizing components of the EIDI system, the ice detection capability may be provided with a minimum of increased weight and complexity.

The invention is not limited to use in conjunction with an electro-impulse deicing system. For example, means may be provided for use in conjunction with a pneumatic boot deicing system in which air pressure inputs to the pneumatic boot are provided at first and second levels, with the first level being less than the second level. The physical response of the boot to an ice detection input signal of the first level should be function of both the level of the input signal and the presence of ice. Such physical response may then be measured to provide a reliable indication of the presence of the ice without supplying a full deicing input signal to the pneumatic boot, with its concurrent problems of unnecessary fatigue stress to the system.

Figure 5:
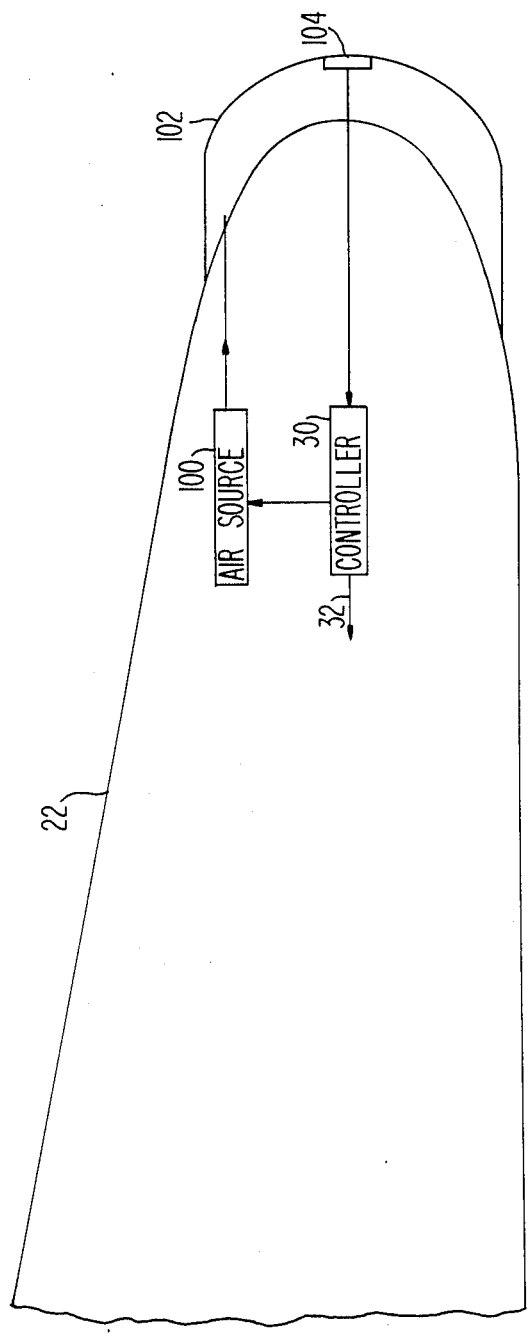
FIG. 5 is a schematic side view of a portion of an aircraft wing including an alternative embodiment of the invention.

An alternative embodiment of the invention used with a pneumatic boot deicing system is shown in FIG. 5. An air source 100 supplies pressurized air at first and second levels to a pneumatic boot 102 formed on the skin 22 of an aircraft wing. Supply of pressurized air at the second level to boot 102 is operative to expand boot 102 and crack away layers of ice which may have accelerated on the boot. Supply of pressurized air at the first level, less than the second level, is operative to slightly expand boot 102. Such slight expansion is detected by a strain gauge 104 formed on boot 102. The degree of expansion of boot 102 is a function of both the supply of pressurized air and the formation of ice on boot 102. Strain gauge 104 provides an output signal to controller 30 which provides an indication of the presence of ice without supplying the full deicing level of pressurized air to boot 102.

The principles of the invention may also be applied in applications not including any type of deicing system. For example, where it is desired to provide an ice detection capability without any components external to the protected structure, a solenoid of a type similar to an EIDI solenoid, but of greatly reduced current capacity may be mounted in proximity to the inner surface of a thin wall structure to be protected. Means such as accelerometer 28 may then be mounted upon the inner surface of the structure to be protected, and a low-level current pulse supplied to the solenoid. The presence of ice is indicated by an output signal from the accelerometer less than the case when no ice is present.

It can be seen, therefore, that the present invention provides apparatus for sensing the presence of ice on structural surfaces while providing minimum increased complexity and weight. Similarly, the invention provides ice detection capability which avoids the unnecessary expenditure of power or imposition of fatigue-inducing forces such that the ice detection system may be reliably incorporated into an automatic ice detection and removal system.

It will be apparent to those skilled in the art that various modifications and variations can be made in the system of the present invention without departing from the scope and spirit of the invention. Thus, it is intended that the present invention cover the modifications and variations of this invention provided they come within the scope of the appended claims and their equivalents.

What is claimed is:

1. Apparatus for sensing and removing ice from a surface, comprising:
   removal means responsive to an input signal for exerting an ice-removal force upon said surface;
   means for sensing a parameter which is a function of said input signal and of the presence of ice; and
   means for generating an ice-presence indicating signal when said sensed parameter reaches a predetermined reference level.

2. Apparatus as recited in claim 1 comprising means for selectively supplying an input signal of first and second levels to said removal means to indicate and remove ice, respectively, said first level being less than said second level.

3. Apparatus as recited in claim 2 wherein said removal means comprises a solenoid.

4. Apparatus as recited in claim 3 wherein said sensing means comprises a current detector connected in circuit relationship with said solenoid.

5. Apparatus as recited in claim 4 wherein said current detector is connected in series with said solenoid.

6. Apparatus as recited in claim 5 wherein said sensing means comprises means for sensing the current passing through said solenoid upon generation of an input signal of said first level.

7. Apparatus as recited in claim 2 wherein said sensing means comprises means for sensing acceleration of said surface.

8. Apparatus as recited in claim 2 wherein said sensing means comprises means for sening movement of said surface.

9. Apparatus as recited in claim 8 wherein said sensing means comprises a Hall effect transducer.

10. Apparatus as recited in claim 2 wherein said removal means exerts an ice removal force upon said surface in a manner so as to excite a plurality of vibrational modes in said surface and said sensing means comprises means for sensing one of said vibrational modes.

11. Apparatus as recited in claim 2 comprising means for automatically generating an input signal of said second level upon generation of said ice-presence indicating signal.

12. Apparatus as recited in claim 2 wherein said supplying means continuously and automatically provides periodic pulses of said first level, and upon generation of said indicating signal ceases supply of pulses at said first level and provides a plurality of pulses at said second level.

13. Apparatus as recited in claim 1 wherein said removal means comprises a pneumatic boot attached to said surface.

14. Apparatus as recited in claim 1 wherein said removal means, said sensing means, and said generating means are located on the interior of said surface.

15. Apparatus for sensing the presence of ice on a structural surface, comprising:
   a solenoid for exerting a force on said surface;
   means for sensing the response of said surface to said force; and
   means for generating an ice-presence indicating signal when said sensed response reaches a predetermined reference level, thereby indicating, the presence of ice.

16. A method for sensing ice on a structural surface equipped with a device for removing ice from said surface upon application of an input signal, comprising the steps of:
   applying said input signal to said device at a first level;
   sensing a parameter which is a function of said input signal and of the presence of ice; and
   generating an ice-presence indicating signal when said sensed parameter reaches a predetermined level, thereby indicating the presence of ice;
   said device for removing ice being effective to remove ice upon application of said input signal at a second level greater than said first level.

* * * * *